Dec. 18, 1962 J. MURGIO 3,069,623

FREQUENCY DIFFERENCE DETECTOR

Filed Aug. 7, 1958

Inventor
JOSEPH MURGIO
By Philip M. Bolton
Attorney

United States Patent Office 3,069,623
Patented Dec. 18, 1962

3,069,623

FREQUENCY DIFFERENCE DETECTOR

Joseph Murgio, Clifton, N.J., assignor to International Telephone and Telegraph Corporation, Nutley, N.J., a corporation of Maryland Filed Aug. 7, 1958, Ser. No. 753,679
4 Claims. (Cl. 324—70)

Figure 1:
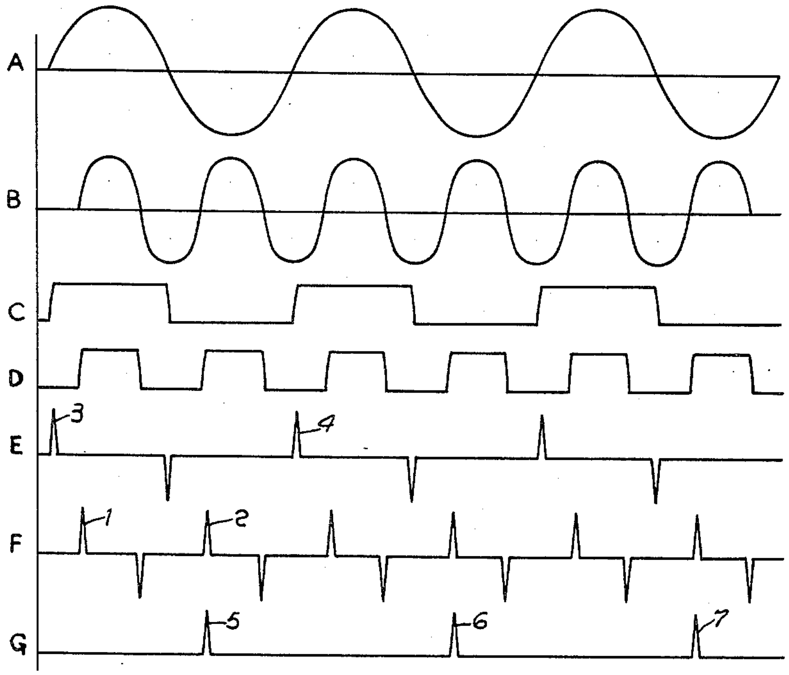

This invention relates to mixing circuits and more particularly to a circuit for detecting the frequency difference between two signals utilized in conjunction with an accelerometer attached to a body for producing pulses each indicative of equal increments of velocity of said body.

It is well known that a frequency signal can be changed by superimposing a local oscillation and rectifying the resulting wave to yield an output that is the difference between the frequency of the signal and the superimposed oscillation, and such an arrangement is known as a "frequency converter" and the process of obtaining the new frequency is referred to as "heterodyne action." The output of such a frequency converter can be considered as having a constant component upon which is superimposed a difference frequency component and various harmonics of the difference frequency and it can be shown that when the input frequency signal to such a converter is much larger in amplitude than the superimposed oscillation, or vice versa, the frequency difference components in the output of said converter are substantially sinusoidal and proportional to the weaker signal and substantially independent of the amplitude of the stronger signal. There are numerous types of converter mixer tubes known in the art which convert frequency by the heterodyne action, such as pentagrid mixer tubes, and the triode-hexode mixer which produce the various harmonics of the difference frequency as well as the difference frequency itself when the input signal and the superimposed oscillations are essentially equal in amplitude.

In some applications, it is desirable to mix two frequency signals having amplitudes which vary at random yielding a difference frequency signal having none of the various harmonics which ordinarily would accompany the output of a frequency converter consisting of the mentioned converter tubes. It is also desirable in some instances to count the number of cycles in the difference frequency output over given intervals of time. One such application is in doppler type radio position finding systems wherein doppler frequency cycles are counted during discrete intervals of time to yield a number indicative of the change in a distance during the interval of time. Such a doppler frequency system is described in Patent No. 2,817,081 of W. Van V. Roberts entitled "Tracking System" wherein a doppler frequency signal and a reference signal are mixed yielding a difference frequency signal and cycles of said difference frequency signal are counted during discrete intervals of time. In still other instances it is desirable to obtain a signal indicative of frequency difference where that frequency difference is very low (less than one cycle per second) while the mixed frequencies are relatively high (many kilocycles). Ordinary converter tubes are not adequate in such instances because of inadequate frequency response over such a wide range.

Therefore, it is one object of this invention to provide means whereby difference signals each of varying or random amplitude may be mixed to yield pulses at a repetition rate equal to the frequency difference between said signals and, furthermore, to provide a signal indicative of the sense of said frequency difference.

It is another object to provide binary circuitry responsive to two different frequency input signals for producing a pulse output having a repetition rate equal to the difference frequency between said input signals and to provide a signal output indicative of the sense of said difference.

It is another object to provide mixing means for producing a frequency difference signal having substantially no low frequency response limitation and limited in high frequency response only by the reaction time of a binary circuit.

It is an object of the invention to employ said mixing means in a velocity-indicating system.

It is a further object of an embodiment of this invention to employ such a mixing circuit to yield pulses having a repetition rate equal to the frequency difference between input signals to said mixing circuit, in conjunction with an accelerometer attached to a body and controlling one of said input signals, to produce pulses each indicative of equal increments of velocity of said body and to also produce a signal indicative of the sense of said increments of velocity.

It is the principal feature of this invention to mix two frequency signals by obtaining pulses at a repetition rate equal to the frequency of each and to feed each set of pulses to one side or the other of a bistable device and also to feed each set of a different gate each controlled by different sides of said bistable device so that the output of one of said gates at a given instant consists of pulses at a repetition rate equal to the frequency difference between said signals when a predetermined one of said signals is at a greater frequency than the other.

It is another feature to combine the outputs of each of said gates via diodes yielding a single pulse output and to feed the output of each gate to a different side of another bistable device whose output is indicative of the sense of said difference frequency.

It is a feature of an embodiment of this invention to generate one frequency signal proportional to the output of an accelerometer and to mix that signal with the frequency signal from a reference source in such a mixer having the above-mentioned features to yield pulses indicative of equal increments of velocity of a body to which said accelerometer is attached and to yield a signal indicative of the sense of said increments of velocity.

Figure 2:
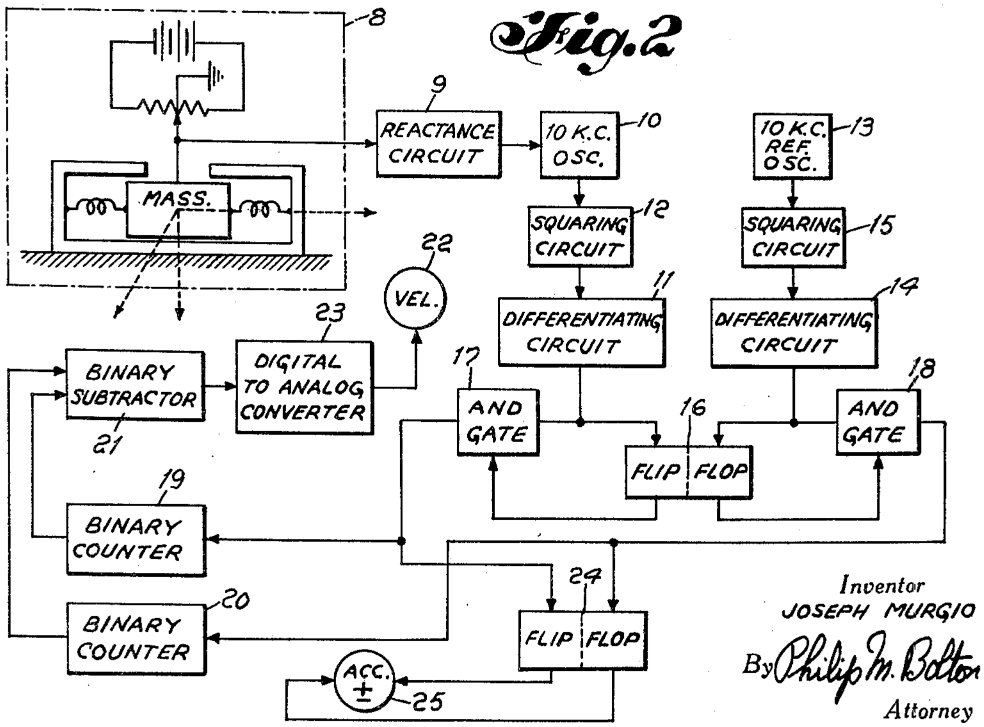

Other and further features and objects of this invention will be more apparent from the following specific description taken in conjunction with the figures in which:

FIG. 1 depicts waveforms from which to gain an understanding of the principle of operation of the invention; and FIG. 2 is a pictorial and block diagram of a system for employing this invention in conjunction with an accelerometer to yield pulses each indicative of equal increments of velocity.

Turning first to the waveforms of FIG. 1 consider two different frequency signals denoted by waveforms A and B respectively, which are to be mixed to yield a signal indicative of the frequency difference. Positive excursions of each of the waveforms A and B are first amplified then clipped to yield the squared forms of waveforms A and B as shown in waveforms C and D, respectively. Each of waveforms C and D are then fed to differentiating circuits producing positive and negative spikes as shown in waveforms E and F, respectively. It should be noted that the positive and negative spikes in waveforms E and F are essentially coincident with the cross-over points (miximum and minimum slope points) of input waveforms A and B respectively. Thereupon by applying waveforms E and F to binary circuitry responsive only to the positive peaks appearing in these waveforms to produce a spike pulse output only when two positive spikes from waveform E or two positive spikes from waveform F occur one after the other without the occurrence of a positive spike in the other waveform in between, waveform G is produced. Thus, successive positive spikes 1 and 2 of waveform F occur between successive positive spikes 3 and 4 of waveform E and appropriate circuitry responsive to waveforms E and F will produce an output spike 5 coincident with spike 2 of waveform F. By the same method output spikes 6 and 7 of waveform G are also produced and it can be seen that the pulse rate of positive spikes appearing in waveform G is equal to the difference in pulse rate between positive spikes appearing in waveforms E and F.

Turning next to FIG. 2 there is shown circuitry coupled to two different signal sources operating in the manner described above in conjunction with an accelerometer controlling one of said signal sources for producing pulses each representative of equal increments of velocity of said accelerometer. In operation, accelerometer 8 provides a D.C. signal proportional to acceleration to reactance circuit 9 which is coupled to 10 kc. oscillator 10 thereby controlling the output frequency of said oscillator in direct portion to the D.C. signal from accelerometer 8. The output of 10 kc. oscillator 10 is fed to a differentiating circuit 11 via squaring circuit 12 which serves merely to amplify and clip the output of the oscillator in the manner shown in waveform C of FIG. 1. At the same time a 10 kc. reference oscillator 13 feeds another differentiating circuit 14 via an identical squaring circuit 15. Thus, if the signals from oscillators 10 and 13 are as described by waveforms A and B then the outputs of differentiating circuits 11 and 14 would be as described by waveforms E and F, respectively. The outputs of differentiating circuits 11 and 14 feed different sides of double input bistable flip-flop circuit 16 and each stage of flip-flop circuit 16 applies a signal to control a different one of "and" gates 17 and 18 which serve to gate the outputs of differentiating circuits 11 and 14 respectively. These "and" gates 17 and 18 and flip-flop circuit 16 are responsive to only positive spikes from differentiating circuits 11 and 14. The output spike pulses from "and" gates 17 and 18 are fed to binary pulse counters 19 and 20, respectively, which serve to count pulses representative of positive equal increments of velocity and negative equal increments of velocity, respectively. Thus, binary number subtractor 21 coupled to the outputs of binary counters 19 and 20 sums all velocity increments detected by accelerometer 8 to yield a binary number indicative of the velocity of the body to which the accelerometer is fixed and this number is applied to velocity indicator 22 via a digital analog converter 23. The outputs of "and" gates 17 and 18 are also each fed to a different side of double input bistable flip-flop circuit 24 and the output of each stage of flip-flop circuit 24 is coupled to accelration sense indicator 25 for indicating the direction of the last velocity change which has occurred.

While there is described above the principles of this invention in connection with specific apparatus, it is to be understood that this description is made only by way of example and not as a limitation on the scope of the invention as set forth in the objects and accompanying claims.

I claim:

1. An accelerometer device producing pulses each indicative of equal increments of velocity of a body and producing a signal indicative of the sense of said increments comprising acceleration sensing means fixed to said body producing a signal indicative of body acceleration, signal generating means coupled to and controlled by said sensing means, reference signal generating means, signal shaping means and differentiating means coupled to each of said generators producing pulses coincident wtih cycles in the output of said generators, a bistable device coupled to each of said differentiating means, signal gates coupled to each of said differentiating means and means coupling the output of said bistable device to each of said gates whereby pulses from one of said gates are each indicative of equal incremnets of velocity of said body and another bistable device coupled to the outputs of said gates for producing a signal indicative of the sense of said increments.

2. A system responsive to the output of an accelerometer for producing pulses each indicative of equal increments of velocity of said accelerometer and for producing a signal indicative of the sense of said increments comprising signal generating means coupled to said accelerometer, a reference signal generator, signal shaping and differentiating means coupled to each of said generators, a double input bistable device coupled to each of said differentiating means, different gating means coupled to each of said differentiating means, means for applying the output of each stage of said bistable device to a different one of said gating means so that the pulses in the output of one of said gating means each represent equal increments of velocity of said accelerometer and a second double input bistable device coupled to each of said gating means for providing a signal indicative of the sense of said increments.

3. A device for converting the analog output of an accelerometer to discrete and equal increments having means to count said increments to thereby indicate the velocity of said accelerometer comprising signal generating means responsive to the output of said accelerometer, reference signal generating means, pulse producing means responsive to each of said signal generators producing two sets of pulses each synchronized with the output of a different one of said generators, gating means controlling said pulses, a bistable device coupled to said pulse generators having output stages coupled to and controlling said gating means, binary counting means coupled to the output of said gating means, a binary subtractor coupled to the output of said counting means for comparing to yield a signal indicative of the velocity of said accelerometer.

4. An accelerometer device producing pulses each indicative of equal increments of velocity of a body and producing a signal indicative of the sense of said increments comprising acceleration sensing means fixed to said body producing a signal indicative of body acceleration, means coupled to said acceleration sensing means to produce a pulse output related to the output of said acceleration sensing means, means to produce a reference pulse output, a bistable device, means coupling said pulse outputs to said bistable device, and gating means coupled to said bistable device and to said pulse outputs whereby the pulse outputs from said gating means are indicative of equal increments of velocity of said body.

References Cited in the file of this patent

UNITED STATES PATENTS

| | | |
|---|---|---|
| 2,473,853 | Boykin | June 21, 1949 |
| 2,738,461 | Burbeck | Mar. 13, 1956 |
| 2,795,695 | Raynsford | June 11, 1957 |
| 2,877,416 | Grisdale | Mar. 10, 1959 |
| 2,904,683 | Meyer | Sept. 15, 1959 |
| 2,988,695 | Leavitt | June 13, 1961 |